United States Patent
Waitkins et al.

[11] 3,967,712
[45] July 6, 1976

[54] WORK CARRIER FOR GRAVITY CONVEYORS

[75] Inventors: Andrew J. Waitkins, Mount Clemens; Ralph E. Beyer, Fraser; Lungchuck Wong, Warren, all of Mich.

[73] Assignee: F. Jos. Lamb Company, Warren, Mich.

[22] Filed: Dec. 24, 1974

[21] Appl. No.: 536,083

[52] U.S. Cl. ............................... 193/1; 193/25 FT; 193/35 F; 198/131
[51] Int. Cl.² ........................................ B65G 11/00
[58] Field of Search ............ 193/1, 2 R, 25 R, 25 A, 193/25 E, 25 AC, 25 FT, 25 C, 35 R, 35 C, 35 F, 38, 41; 198/131; 206/349; 104/134

[56] References Cited
UNITED STATES PATENTS

| 752,341 | 2/1904 | Hopkins | 193/38 |
|---|---|---|---|
| 1,339,060 | 5/1920 | Hansen | 193/38 X |
| 2,744,601 | 5/1956 | Chilton | 193/25 IE |
| 2,948,375 | 8/1960 | Dabich | 193/35 F |
| 3,090,478 | 5/1963 | Stanley | 198/131 |
| 3,168,177 | 2/1965 | Schuricht | 193/25 FT |
| 3,199,552 | 8/1965 | Nordfors | 198/131 X |
| 3,322,251 | 5/1967 | Whitfield | 193/25 R |
| 3,529,706 | 9/1970 | Bru | 193/25 R X |
| 3,540,561 | 11/1970 | Becker | 193/35 R |
| 3,856,075 | 12/1974 | Larkin | 193/35 C X |

FOREIGN PATENTS OR APPLICATIONS

| 558,453 | 1/1944 | United Kingdom | 193/35 R |

OTHER PUBLICATIONS

Wick, C. H., "Standardization," F. Joseph Lamb Co. Publication, Detroit, Michigan, 1960.

Primary Examiner—Evon C. Blunk
Assistant Examiner—James L. Rowland
Attorney, Agent, or Firm—Barnes, Kisselle, Raisch & Choate

[57] ABSTRACT

A gravity conveyor of the chuting or rollerway type wherein workpieces of regular or irregular shape having easily damaged surfaces are supported within protective work carriers which roll or slide along the conveyor. The work carriers are of cylindrical shape and formed with a through co-axial bore.

10 Claims, 15 Drawing Figures

FIG. 1

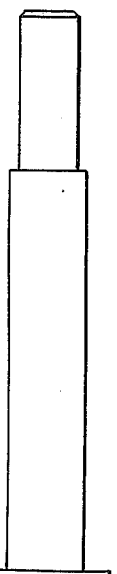
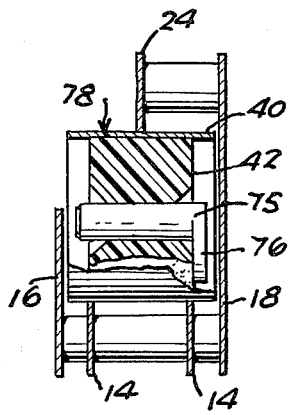
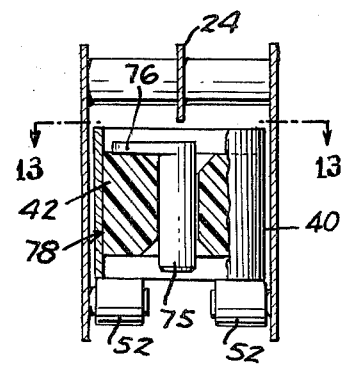
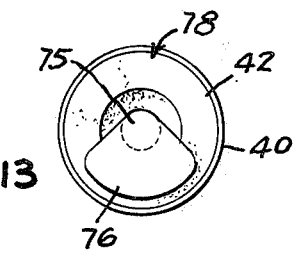
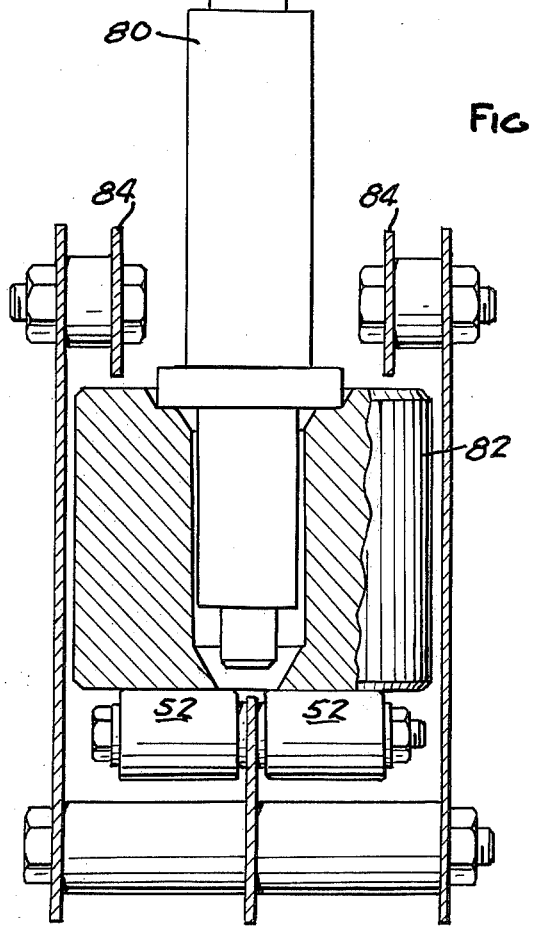
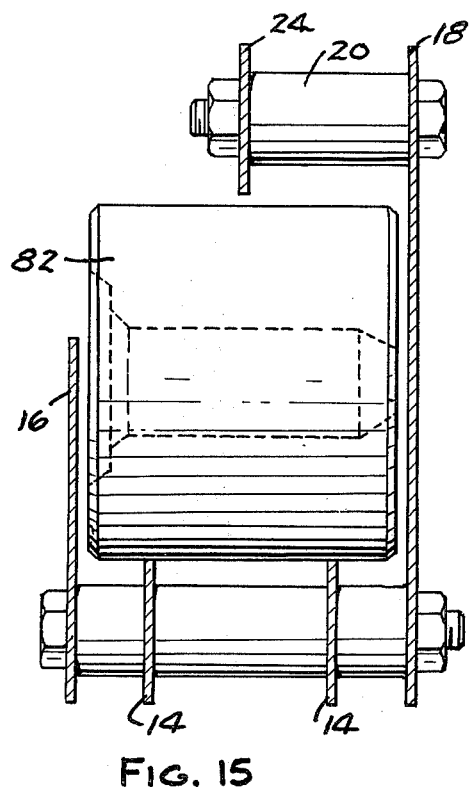
Fig. 11  Fig. 12
Fig. 13
Fig. 14  Fig. 15

WORK CARRIER FOR GRAVITY CONVEYORS

This invention relates to the improvement in the utilization of conveyors where the workpieces are conveyed by gravity rolling on their diameter as disclosed in U.S. Letters Pat. No. 2,815,841. The improvement of this invention also relates to the utilization of gravity conveyors where the workpieces are conveyed by traveling on rollers as shown in U.S. Letter Pat. No. 2,948,375. More specifically, the invention relates to such conveyors in combination with work carries designed for use therewith.

Many workpieces do not lend themselves to be conveyed by these systems mainly by reason of their geometric shape. The workpiece shape requirements are that they have a round exterior that will roll on rails and that they have a sufficiently short length to prevent them from turning or binding between the side guide rails of the conveyor. In order to roll on rollers, the workpiece must have a flat surface sufficient to span at least two successive conveyor rollers at all times and have a height that is short with a low center of gravity to render them stable and resist toppling over in the conveyor. Workpieces without these geometric requirements have not been successfully conveyed in these types of conveyors in the past. The present invention not only broadens the utility of gravity conveyors by permitting the handling of workpieces of almost universal shapes, but just as important, permits the conveying of workpieces that would otherwise be damaged. It is not unusual to have portions of the surfaces of workpieces with finishes that would be damaged by contact with each other or by contact with the conveying equipment.

In view of the foregoing, it is an object of the present invention to provide means to permit the handling of most shapes of workpieces by gravity chuting conveyors.

It is another object of this invention to convey fragile workpieces without contact with each other or without contact with the conveyor.

It is a further object of this invention to convey one or more workpieces in a carrier that will be influenced by gravity to roll on its diameter on rails or travel on rolls when standing on its end.

Further objects of this invention will be apparent from the detailed description with reference to the accompanying drawings, in which:

FIG. 11 shows a cross section of a gravity conveyor, work carrier and a asymmetric workpiece;

FIG. 12 shows a cross section of a rollerway conveyor, work carrier and the workpiece of FIG. 11;

FIG. 13 shows a view of the work carrier and workpiece along line 13—13 of FIG. 12;

FIG. 14 shows a cross section of another form of rollerway conveyor, work carrier and workpiece;

FIG. 15 shows a cross section of another form of gravity conveyor with the work carrier of FIG. 14.

Figure 1:
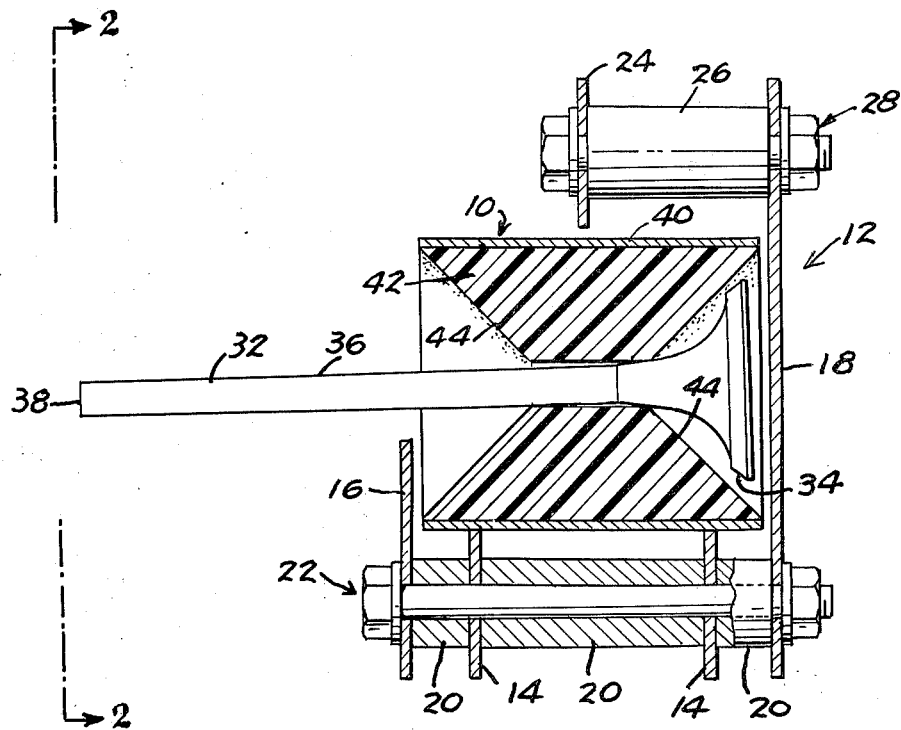
FIG. 1 is a cross sectional view of a gravity conveyor, work carrier and workpiece.
Figure 2:
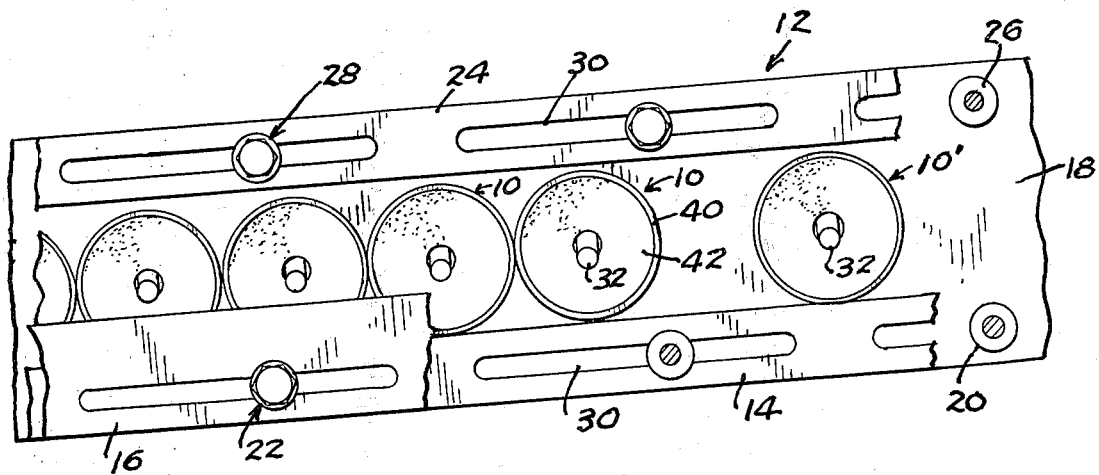
FIG. 2 is a side elevation as viewed along line 2—2 of FIG. 1 with parts broken away.
Figure 4:
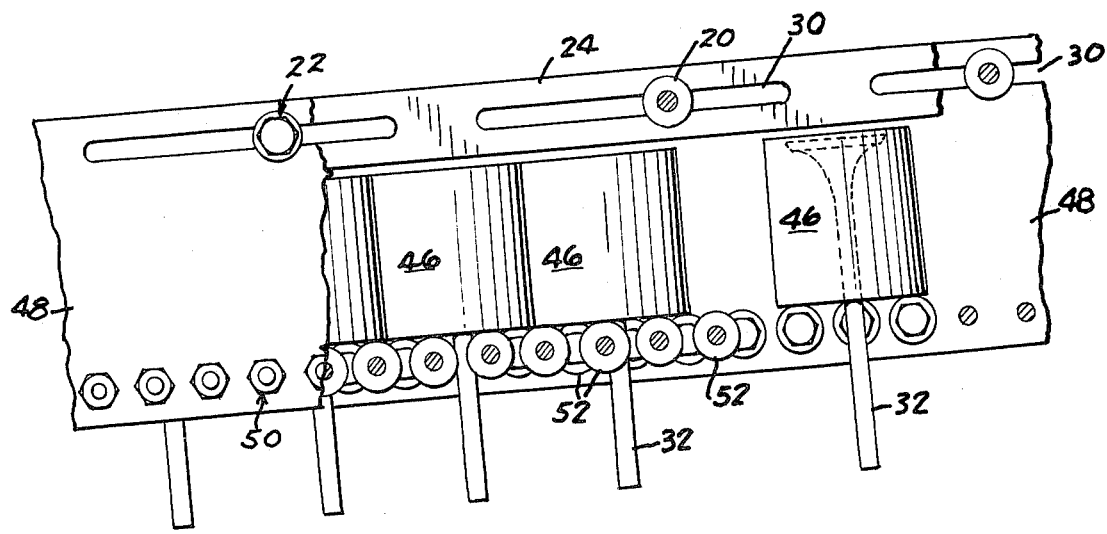
FIG. 4 is a side elevation as viewed along line 4—4 of FIG. 3 with parts broken away.

In FIGS. 1 and 2 work carrier assembly 10 is shown carried in gravity chuting assembly 12 inclined at such an angle that the work carrier 10 will roll on its diameter under the influence of gravity along two carrier rails 14 and guided on its ends by side retainer rails 16 and 18. Rails 14, 16 and 18 are properly located by tubular spacers 20 and are securely held together by bolt, nut and washer assembly 22. Work carrier assembly 10 is retained within the confines of the gravity chuting assembly 12 by an upper retainer rail 24 which is located by a spacer and retained by bolt and nut assembly 28. All of the rail members 14, 16, 18, 24 are preferably made of an alloy strip steel that has been heat treated to have the characteristics of a spring. This material is known in the steel industry as blue tempered strip spring steel. The temper of this steel renders it relatively hard and difficult to machine with conventional cutters, but it can be readily pierced and sheared with common sheet metal tools. This preferred material is selected first for its ability to be hand formed into smooth curves and, secondly, for its unique wearing and scuff resisting qualities. It also has the advantage of being shop prepared with holes and slots and then coiled for shipment to the construction site for the chuting assembly and erection. As shown in FIG. 2, all of the rails, with exception of retainer rail 18, have slots 30 pierced through to accommodate the securing bolt. These longitudinally aligned slots are so placed that the distance between the adjacent extremities of each pair of slots is materally less than their length so that, although the slots in rails 14, 16, 24 may be transversely misaligned, the securing bolts may be inserted through the slots to match the regularly spaced holes in the side retainer rail 18. It will be appreciated that rail 18 can also have slots therein rather than round holes as shown. This arrangement is illustrated in FIG. 4. From the above description of the construction of the chuting it is apparent that it can be assembled without tightening the nuts and bolts so that it can be curved in erection to follow any desired tortuous path to conveniently reach its destination and the nuts then tightened to establish a rigid, permanent and relative inflexible structure.

Work carrier 10, shown in section in FIG. 1, is carrying a poppet valve 32 of the type used in internal combustion engines. This workpiece was selected for illustration in this case because it is fairly representative of the type of difficult parts that must be handled in modern manufacturing. The valve must be transported from one manufacturing operation to the next through the entire sequence of operations and, as it progresses, more and more of its critical surfaces become vulnerable to permanent damage caused by contact with each other or from contact with the handling equipment. Assuming that the valve shown in FIG. 1 is in a finished condition, the angular valve seat 34, the stem diameter 36, and the end of the stem 38 must be protected from nicks, scratches and blemishes of any kind. The work carrier has been designed to avoid such injury to the workpiece. The outside tubular metal shell 40 has molded within it a workpiece contacting liner 42 of a relatively soft, resilient material, such as plastic or rubber, for example, polyurethane of one of the hard durometers. The conical recess 44 of liner 42 provides a cavity to accomodate the head of the valve and also serves as a tapered socket for facilitating loading the valve into either end of the work carrier. The metal tubular shell 40 provides a suitable wearing surface to contact the chuting assembly 12. When the work carrier containing the valve is in place in the chuting assembly as shown in FIG. 1, it will be rolling on rails 14 and guided by rails 16, 18 and retained within the assembly by rail 24. The valve will be retained in the carrier by rail 18.

In FIG. 2 there are shown several work carriers 10 containing valves 32 in a contacting, non-rolling condition. This assumes that the chuting is full of parts up to this point. Carrier 10' is rolling downwardly on inclined rails 14 and will be stopped by and will join the non-rolling line of carriers. At the terminal end of the conveyor, when the carriers are removed as required for the machining of the workpiece at the next operation, the line of carriers will advance by rolling on the support rails 14.

Figure 3:
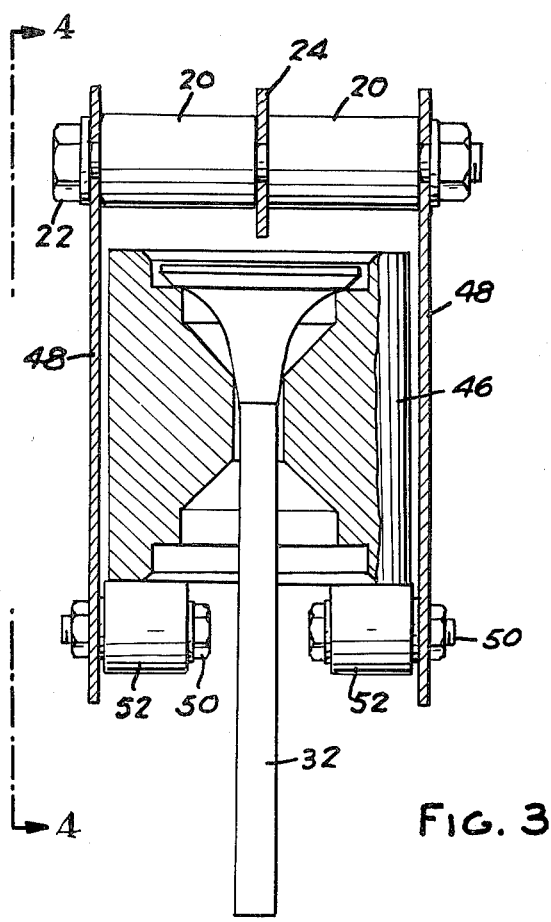
FIG. 3 is a cross sectional view of another form of gravity rollerway conveyor with work carrier and workpiece.

FIGS. 3 and 4 carriers 46 serve the same purpose and are carrying the same workpieces 34 as carrier 10 in FIGS. 1 and 2; although carrier 46 serves the same purpose and may be used in the first described chuting, it merely illustrates an alternate construction where the carrier is formed of a single suitable material without the tubular enclosure. Carrier 46 may be formed of metal or a durable plastic material since it is subjected to rolling rather than sliding action. The chuting is designed to carry the work carrier 46 with its lower end supported by rollers. Two side rails 48 and retainer rail 24 are separated by tubular spacers 20 and secured by bolt, nut and washer assembly 22. At the lower portion of the side rails 48 two rows of rollers 52, preferably of the ball bearing type, are arranged to support work carriers 46 and are secured by bolt and nut assemblies 50. The rollers 52 are spaced so that at least two on each side are in contact with the work carrier at all times. In this roller chuting arrangement the workpieces 32 are carried in a vertical orientation. The selection of which system to use, that of FIGS. 3 and 4 or the one shown in FIGS. 1 and 2, largely depends on the method of loading and unloading at the various work stations.

FIGS. 1, 2, 3 and 4 show the basic types of chuting and carrier construction employed in the following description of handling other various workpieces, although additional minor components will be disclosed and discussed.

Figure 5:
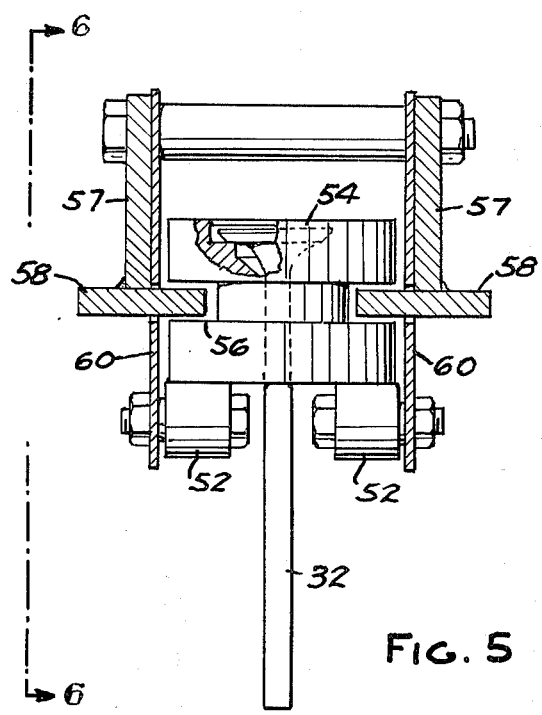
FIG. 5 is a cross sectional view of another form of gravity rollerway conveyor, workpiece and work carrier with center circular groove.
Figure 6:
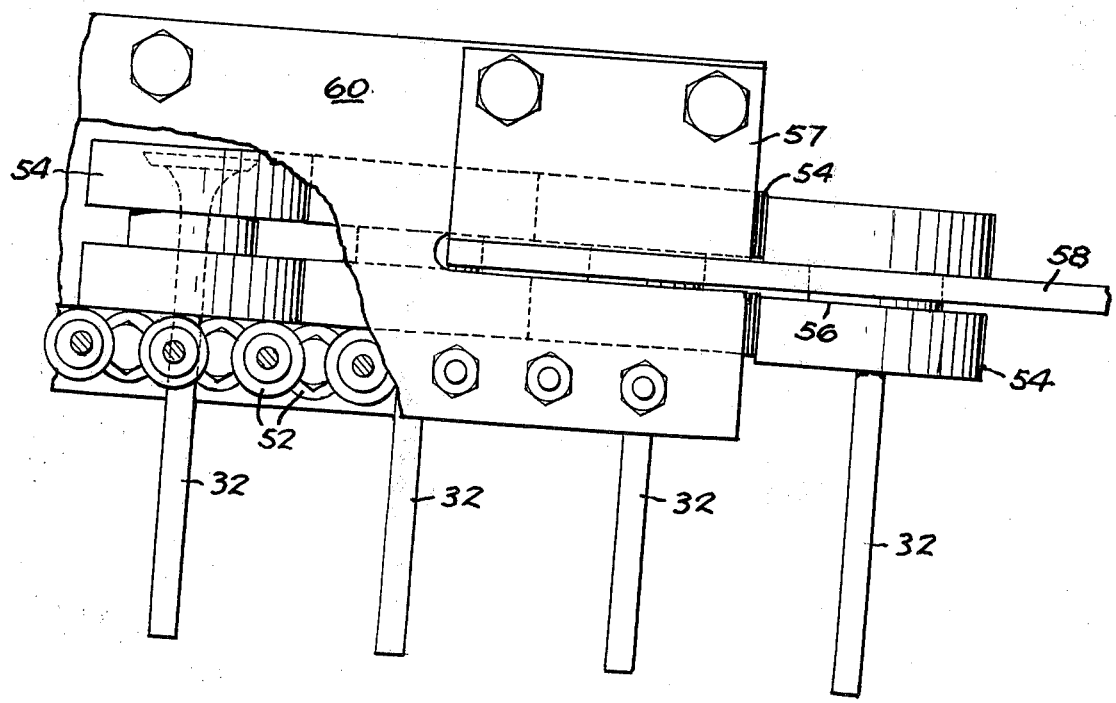
FIG. 6 is a side elevation as viewed along line 6—6 of FIG. 5 with parts broken away.

In FIGS. 5 and 6 a desirable variation of the work carrier is shown. Riding on rollers 52 is a circular work carrier 54 which has a circular groove 56 formed on its diameter. Secured by plates 57 to the side of the chuting are horizontal guide rails 58 extending through and beyond the ends of side rails 60 and so arranged as to enter the circular groove 56 of carrier 54 as it emerges from the end of the chuting. One purpose for this arrangement is to have the carrier and its workpiece in a position where the chuting will not interfere with the loading or unloading of the workpiece. Another important feature of this construction is that the side rails 58 can be twisted 90° beyond the end of the chuting to orient the work carrier to a rolling position so that it can be readily received by a rolling type conveyor.

Figure 7:
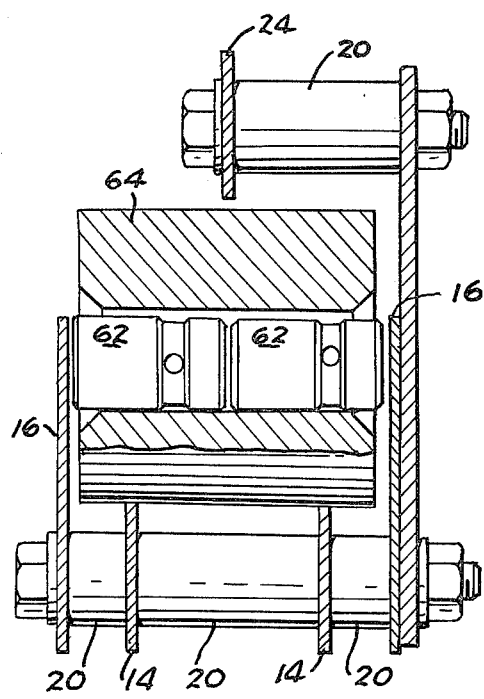
FIG. 7 shows a cross sectional view of gravity conveyor similar to FIG. 1 with a work carrier and two workpieces.
Figure 8:
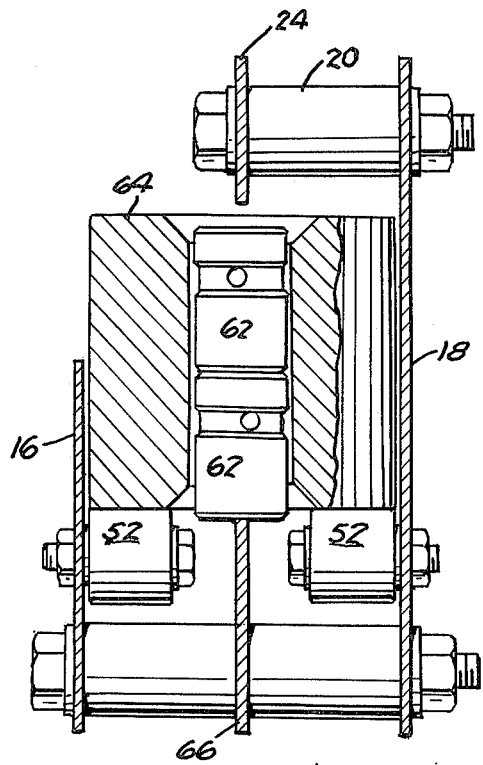
FIG. 8 shows a cross sectional view of a rollerway conveyor and carrier with the workpieces of FIG. 7.

FIGS. 7 and 8 illustrate a variation where two workpieces 62 are carried in a single metallic or nonmetallic work carrier 64. When the work carrier is in the rollerway chuting of FIG. 8 the workpieces are retained by support rail 66. When the work carrier is arranged in the manner illustrated in FIG. 7 it is supported for rolling movement on rails 14. These arrangements may be utilized where the critical surfaces are the cylindrical surfaces of workpieces 62 and rubbing of the ends of the workpieces on support rail 66 or side rails 16 causes no damage. This serves to illustrate that the invention is not restricted to a work carrier conveying a single part.

Figure 9:
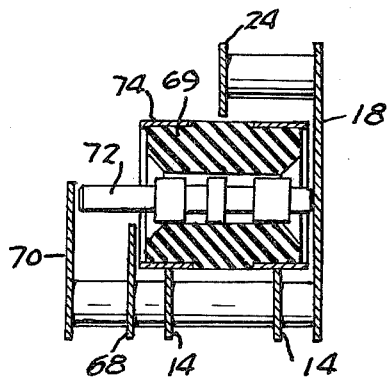
FIG. 9 shows a section of another form of gravity conveyor with a work carrier and workpiece.
Figure 10:
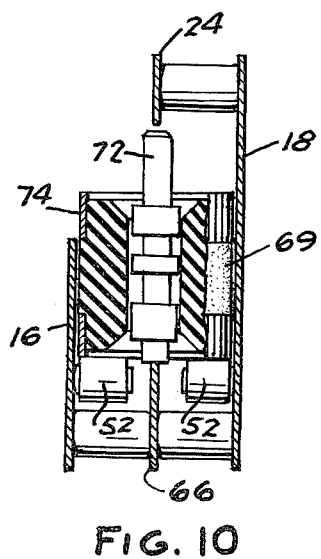
FIG. 10 shows a cross section of another form of rollerway conveyor and carrier with the workpiece of FIG. 9.

FIGS. 9 and 10 show two further variations of the invention. In FIG. 9 side rail 68 retains the work carrier 69 and side rail 70 retains workpiece 72. The other variation is the showing of two wear rings 74 replacing the tubular shell 40 of FIG. 1.

FIGS. 11, 12 and 13 illustrate that the workpiece in a carrier need not be symmetrical. In this case the workpiece 75 has an off-side head portion 76 that is treated in the same manner as any of the workpieces in the foregoing disclosure. It will be understood that if the head portion 76 is off-side as shown and the work carrier 78 rolls on its diameter as in FIGS. 11 and 13, the workpiece may not rotate with the carrier, but the head will remain depending position shown and, thus, there will be relative rotation between the workpiece and the carrier. This is of not consequence since the lining portion of the work carrier may have nonmarring characteristics and no damage to the workpiece will occur. As added protection for the workpiece, it will be noted that shell 40 projects outwardly beyond the opposite ends of liner 42. Generally speaking, if the work carrier is not formed as a one piece metallic body and is designed to roll or slide on the edges of support rails, it is provided with an outer metallic shell.

FIGS. 14 and 15 a long workpiece 80 with several diameters extending along its length is being carrier in a work carrier 82 without the benefit of a top retaining rail over the workpiece. This allows it to be loaded and unloaded vertically from the work carrier without the carrier being removed from the chuting as shown in FIG. 14. The retaining rails 84 are arranged over the work carrier 82 to prevent its toppling over as might otherwise result from the height of workpiece 80 and the resulting high center of gravity. With this instability in mind, the work carrier 82 can be made of a heavy material, such as steel, which would substantially lower the center of gravity of the combination of workpiece and carrier.

FIG. 15 shows the work carrier 82 without the workpiece in chuting rolling on its diameter. This arrangement may be used after the work carrier has been emptied. It may be returned to the beginning of the conveying system in this mode, utilizing a less expensive system of chuting than is required when carrying the workpieces 80 shown in FIG. 14.

We claim:
1. In combination with a conveyor of the type having a pair of longitudinally extending side rails connected together in transversely spaced apart relation and support means disposed between said side rails and providing a support surface disposed at a level below the upper edges of said side rails, a workpiece carrier comprising a means defining a hollow circular cylindrical metal shell which is open at both ends and nonmetallic insert fixed therein, said shell extending at its opposite ends to at least the ends of said insert so that at its opposite ends the axially outermost portion of the carrier is defined by at least an annular metal surface, each end of said shell lying in a plane perpendicular to the central axis of the shell, said insert having an axial bore extending there through which is coaxial with said shell, said shell and said insert being symmetrical both radially and axially about the midpoint of the axis of the bore of said insert, the axially central portion of said bore being cylindrical and of uniform circular shape whereby a workpiece can be supported by the insert by inserting the workpiece into either end of said bore and the carrier can be supported on said support means with its axis extending horizontally or vertically, and support means engaging the metallic outer peripheral surface of said shell forming means when the carrier is supported with its axis extending horizontally and the support means engaging either of said annular metal surfaces when the carrier is supported with its axis extending vertically.

2. The combination called for in claim 1 wherein the opposite ends of said insert terminate inwardly of the opposite ends of said shell.

3. The combination called for in claim 1 wherein each of the opposite ends of said bore taper radially outwardly in an axially outwardly direction.

4. The combination called for in claim 1 wherein the radial thickness of said shell is substantially less than the radial thickness of said insert.

5. The combination called for in claim 1 wherein the axially opposite ends of said insert are spaced axially inwardly of the adjacent axially opposite ends of said shell and define workpiece support faces which are disposed perpendicular to the axis of said bore.

6. The combination called for in claim 1 including a workpiece supported by said carrier, said workpiece having a stem portion extending axially through the central cylindrical portion of said bore and having a radially enlarged head portion at one end thereof, the radial dimension of said head portion being less than the radial dimension of said insert and means at each end of the carrier forming a recess therein of at least slightly greater depth than the axial dimension of said head portion and of at least slightly greater radial dimension than said head portion.

7. The combination called for in claim 6 wherein each of said recesses is formed at least in part by the end faces of said insert.

8. The combination called for in claim 7 wherein the opposite ends of the insert terminate axially inwardly of the opposite ends of said shell forming means.

9. The combination called for in claim 7 wherein the axially inner end portions said recesses are defined by flat faces on said insert which are perpendicular the axis of said bore.

10. The combination called for in claim 1 wherein the outer periphery of the carrier is of uniform maximum diameter adjacent the opposite ends thereof.

* * * * *